United States Patent
Mizutani et al.

(10) Patent No.: US 7,431,413 B2
(45) Date of Patent: Oct. 7, 2008

(54) IMAGE FORMING APPARATUS, IMAGE FORMING METHOD AND IMAGE FORMING PROGRAM

(75) Inventors: Toshiyuki Mizutani, Hino (JP); Kenichirou Hiramoto, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 458 days.

(21) Appl. No.: 11/210,547

(22) Filed: Aug. 24, 2005

(65) Prior Publication Data

US 2006/0044339 A1    Mar. 2, 2006

(30) Foreign Application Priority Data

Aug. 27, 2004    (JP) ............................. 2004-248793

(51) Int. Cl.
    *B41J 2/205* (2006.01)
(52) U.S. Cl. .......................................... 347/15; 358/1.9
(58) Field of Classification Search ............ 347/15, 347/41, 43, 12, 19; 358/1.2, 1.9, 3.23, 524, 358/3.01, 3.03, 3.05
    See application file for complete search history.

(56) References Cited

U.S. PATENT DOCUMENTS

| | | | | |
|---|---|---|---|---|
| 4,635,078 | A * | 1/1987 | Sakurada et al. ............... | 347/15 |
| 5,333,262 | A | 7/1994 | Ulichney | |
| 6,264,300 | B1 | 7/2001 | Warner | |
| 6,515,768 | B1 * | 2/2003 | Deschuytere et al. ...... | 358/3.06 |
| 2002/0149635 | A1 * | 10/2002 | Askeland et al. ............... | 347/9 |
| 2004/0017415 | A1 * | 1/2004 | Nunokawa .................... | 347/15 |

FOREIGN PATENT DOCUMENTS

| | | |
|---|---|---|
| EP | 0 401 123 A2 | 12/1990 |
| EP | 0 779 159 A2 | 6/1997 |
| EP | 0 796 002 A1 | 9/1997 |
| EP | 0 889 639 A1 | 1/1999 |
| EP | 0 962 323 A1 | 12/1999 |
| EP | 1 434 423 A2 | 6/2004 |
| JP | 2000-006444 | 1/2000 |
| JP | 3208777 | 7/2001 |
| JP | 3292104 | 3/2002 |
| JP | 2003-080682 | 3/2003 |
| JP | 3480924 | 10/2003 |
| JP | 2004-001311 | 1/2004 |

OTHER PUBLICATIONS

European Search Report for Application No. 05107666.9-2202 dated Nov. 8, 2005.
Ulichney, Robert: "Video Rendering" Digital Technical Journal, vol. 5 No. 2 Spring 1993, pp. 9-18.

* cited by examiner

Primary Examiner—Lamson D. Nguyen
(74) Attorney, Agent, or Firm—Cantor Colburn LLP

(57) ABSTRACT

An image forming apparatus, for forming an image by using distribution of plural types of dots, including: a first section, for making comparison between a pixel value of a target pixel and a value in a dither matrix stored in advance, and determining, whether a dot having the highest density be formed at a position corresponding to the pixel; a second section for determining whether a second type dot having lower density be formed at the position where the dot having the highest density is determined not to be formed; and a section for instructing, based on results of determination by the first and second sections, whether a dot should be formed at the position, wherein the dither matrix comprises values, each being not less than a predetermined value smaller than the maximum pixel value of the input image.

31 Claims, 12 Drawing Sheets

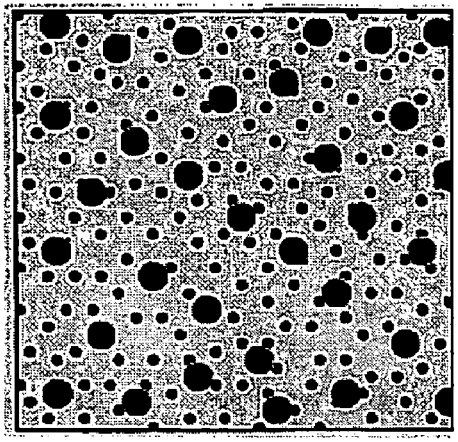
FIG. 13 (c) SELECTION OF SMALL/LARGE DOT 8.5%
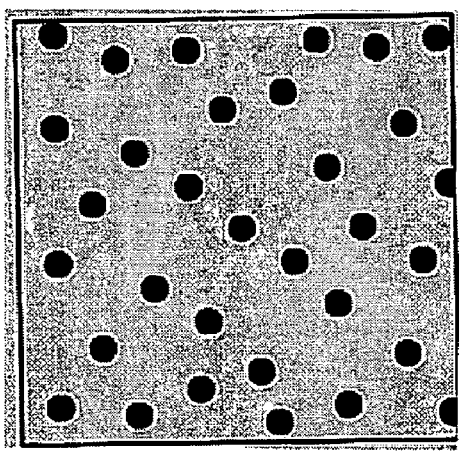
FIG. 13 (b) SELECTION OF LARGE DOT 1%
PRIOR ART
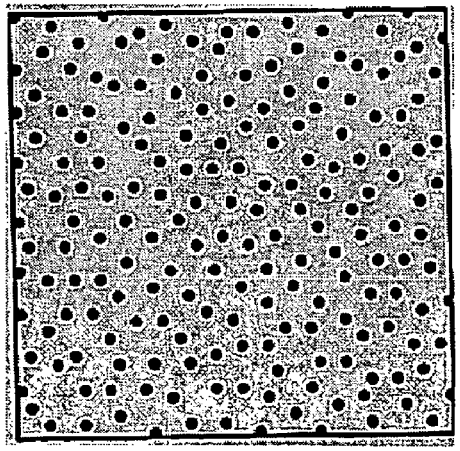
FIG. 13 (a) SELECTION OF SMALL DOT 7.5%

IMAGE FORMING APPARATUS, IMAGE FORMING METHOD AND IMAGE FORMING PROGRAM

This application is based on Japanese Patent Application No. 2004-248793 filed on Aug. 27, 2004 in Japanese Patent Office, the entire content of which is hereby incorporated by reference.

BACKGROUND OF THE INVENTION

1. Field of the Invention

The present invention relates to an image forming apparatus, an image forming method and an image forming program, particularly to an image forming apparatus, an image forming method and an image forming program for forming an image by distribution of two or more types of dots having different densities per unit area.

2. Background of the Invention

A printing apparatus for printing an image by a personal computer or the like is exemplified by a printer using the ink of three colors, magenta (M), cyan (C) and yellow (Y), and a printer using the ink of four colors composed of the aforementioned three colors plus black (K). Such a printer allows an image to be formed by turning on or off the dot of each hue.

In recent years, by contrast, there have appeared many types of printers wherein, in order to get a high-quality output image, inks of different densities within the same hue (e.g. dark colored ink and light color ink) are used or different ink dot diameters are utilized so that a dot having a plurality of gradation levels in one hue is formed.

However, even if the aforementioned dots each having a plurality of gradation levels in one hue can be formed, the image may deteriorate in some cases if these dots are not arranged adequately. For example, to get an output image having a large dot (having a large area, hence high dot density per unit area) and a small dot (having a small area, hence low dot density per unit area), binary halftone processing is applied to each dot; then the pixel values are added up. Thus, although the distribution of small dots alone (FIG. 13(a)) and distribution of large dots alone (FIG. 13(b)) are satisfactory, distribution of the overlapped dots cannot be said to be satisfactory in many cases, with the result that the graininess in the final image considerably deteriorate (FIG. 13(c)).

Solution to this problem has been found in the method wherein a plurality of types of dots having the different densities per unit area are arranged in the form associated with one another. For example, such a method is disclosed in Patent Documents 1 and 2.

In Patent Document 1, a lump formed by a collection of small dots is replaced by a medium dot and the lump formed by a collection of medium dots is replaced by a large dot.

In Patent Document 2, 100% or more of light dots (lower density per unit area) are introduced. When there is a reduction in the difference in density from the dark dots (higher density per unit area), the dark dots are introduced.

In this case, when a plurality of dots having different densities per unit area are controlled, large dots or dark dots are formed after the small dots or light dots have occupied up to 100 percent, if the simple multilevel error diffusion method or dither method is used, or when the method disclosed in the Patent Document 2 is employed.

However, such a method allows the ink to be introduced in excess of the permissible level in some cases, with the result that the image quality will be worsened. Thus, this method will set a limit to the type of the recording medium that can be used.

A proposal for solving such problems is proposed in Patent Documents 3 and 4. To be more specific, this is a technique of allowing the large dots and dark dots to be mixed with the small dots and light dots before the coverage ratio of the small dots and light dots reaches 100 percent.

The Patent Document 3 permits the second dots to be mixed before the first dots reaches 100 percent, by reducing the difference between the threshold value 1 for determining formation of the first dot and the threshold value 2 for determining formation of the second dot (>threshold value 1). This procedure reduces the overall amount of ink.

The Patent Document 4 controls the threshold value 1 and threshold value 2, whereby the percentage of the occurrence of the first and second dots is made to conform to the density to be achieved.

The Patent Documents 5 and 6 use recording rate determining means to determine the recording rate for each level of dot with regard to input value when arranging a plurality of dots having different densities per unit area.

Patent Document 1: Unexamined Japanese Patent Application Publication No. 2004-1311

Patent Document 2: Unexamined Japanese Patent Application Publication No. 2003-80682

Patent Document 3: Official Gazette of Japanese Patent No. 3480924

Patent Document 4: Unexamined Japanese Patent Application Publication 2000-6444

Patent Document 5: Official Gazette of Japanese Patent No. 3208777

Patent Document 6: Official Gazette of Japanese Patent No. 3292104

However, in the aforementioned Patent Document 1, a spurious profile occurs when the dot diameter is changed. If an image is formed using the dot having a smaller diameter, banding resulting from irregular dot formation will stands out more conspicuous. Further, this method fails to ensure a sufficient dispersion of large dots.

The Patent Document 2 cannot impose a restriction to the amount of ink, as described above, and hence sets a limit to the type of the recording medium that can be used. Such problems have been left unsolved in this technique.

According to the Patent Document 3, the resultant dot coverage ratio of the first and second dots cannot be determined uniquely and the gradation is reversed in some cases.

According to the Patent Document 4, the dot ratio in a predetermined range can be determined, but when viewed locally, the dispersion of the second dots is very poor and contrast irregularities occurs easily.

To be more specific, in the technique disclosed in the Patent Documents 3 and 4, large dots are produced in terms of probability, and differences in densities of the dark dots appears easily, with the result that visual irregularities are often found. Such problems have been left unsolved in this technique.

According to the Patent Documents 5 and 6, it is necessary to determine and to memorize the recording rate for each of the plurality of dots having different densities per unit area, and this leads to the problem that the processing for these processes becomes complicate and need long processing time. Further, with regard to the problems of ink amount and banding, it is effective to change the recording rate corresponding to recording method or kind of recording media, therefore, according to the Patent Documents 5 and 6, it is also necessary to determine a recording rate table according to each recording method and recording medium.

SUMMARY OF THE INVENTION

An embodiment of the present invention is to provide an image forming apparatus, an image forming method and an image forming program for forming an image using two or more types of dots having different densities per unit area, wherein excellent dot distribution and adequate restriction in the amount of ink are ensured, and the image processing time is shortened.

One of the Features of the present invention in achieving the aforementioned embodiment is:

(1) An image forming apparatus, for forming an image using the distribution of two or more types of dots having different densities per unit area, comprising:

a first dot formation determining section, for making comparison between the pixel value in the target pixel on the input image and the dither matrix stored in advance, and for determining, based on the result of this comparison, whether or not the dot having the highest density, out of two or more types of dots having the different densities per unit area, should be formed at the position corresponding to the aforementioned target pixel;

a second dot formation determining section for determining whether or not a dot whose density per unit area is lower than that of the dot used in the first dot formation determining section should be formed at the position where the first dot formation determining section has determined that the dot should not be formed; and a dot formation instructing section for instructing, based on the result of determination by the first and second dot formation determining sections, whether or not a dot should be formed at the position corresponding to the aforementioned target pixel;

wherein the aforementioned dither matrix is composed of values each of which is equal to or greater than a predetermined value greater than 0 and smaller than the maximum value taken by the pixel value of the input image.

According to the image forming apparatus described in Feature (1), based on the result of comparison between the pixel value in the target pixel on the input image and the dither matrix composed of values each of which is equal to or greater than a predetermined value greater than 0 and smaller than the maximum value taken by the pixel value of the input image, the first dot formation determining section determines whether or not the dot having a higher density per unit area should be formed. This function allows the dot ratio to be controlled, for example, in such a way that the first dot formation determining section prevents a dot from being produced at least until the pixel value exceeds the predetermined level. Further, in the pixel value equal to or greater than the predetermined level, this function restricts the position of the pixel where the dot is forcibly produced in response to the dither matrix, and hence controls the dispersion of a visibly conspicuous dot of high density. Further, only when it has been determined that a dot is not formed by the first dot formation determining section, decision is made by the second dot formation determining section. This arrangement cuts down processing time.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 13($a$) is an image diagram showing the result of halftone processing of small dots in the PRIOR ART;

FIG. 13($b$) is an image diagram showing the result of halftone processing of large dots in the PRIOR ART; and FIG. 13($c$) is an image diagram showing the result of placing FIG. 13($a$) on top of FIG. 13($b$) in the PRIOR ART.

DETAILED DESCRIPTION OF THE INVENTION

Figure 1:
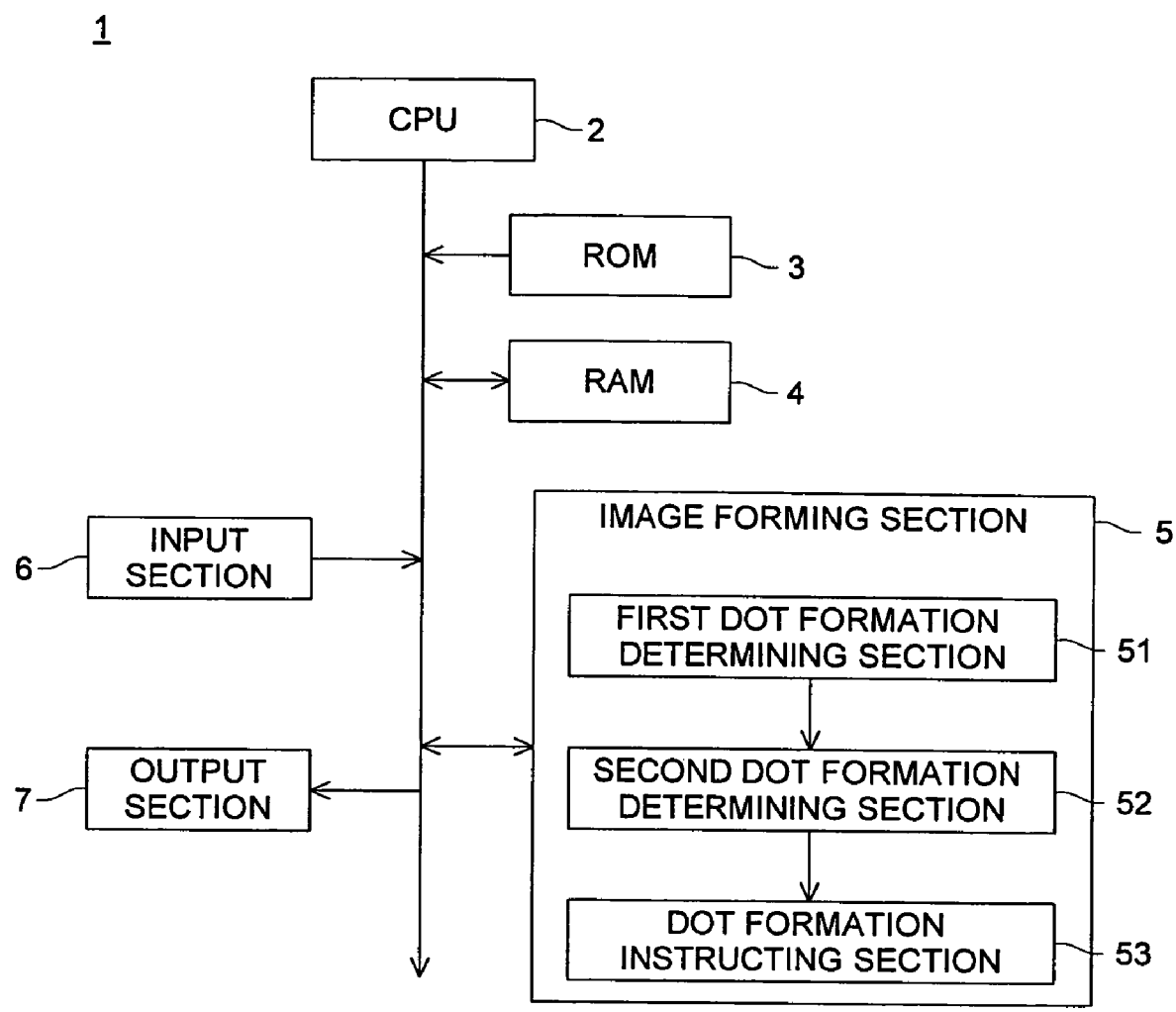
FIG. 1 is a block diagram representing the schematic configuration of an image forming apparatus of the present invention.

Further, the aforementioned embodiment can be achieved by the following Feature of the invention:

(2) The image forming apparatus described in the Feature (1), wherein the second dot formation determining section determines whether or not any one of a plurality of types of the dots whose density per unit area is lower than that of the dot used in the first dot formation determining section should be formed, and determines whether or not this processing should be applied in such a way that a dot having higher density per unit area is formed earlier.

According to the Feature (2) as described above, a decision made by the second dot formation determining section is not restricted to one type; it can be made on a multilevel basis. In this case, the dot ratio can be controlled similarly to the case of Feature (1). The dispersion of the visually conspicuous dots of higher density can be controlled and hence the processing time can be reduced.

(3) The image forming apparatus described in Features (1) or (2), wherein the second dot formation determining section makes a comparison between the pixel value of the aforementioned target pixel and a value obtained by subtracting from each value of the dither matrix a fixed value in response to the density of the dot used by the second dot formation determining section, and, based on the result of this comparison, the second dot formation determining section determines whether or not any one of the dots having each density should be formed at the position where the first dot formation determining section determined that a dot should not be formed.

According to Feature (3), the second dot formation determining section makes a comparison between the pixel value of the aforementioned target pixel and a value obtained by subtracting from each value of the dither matrix a fixed value in response to the density of the dot used by the second dot formation determining section. Based on the result of this comparison, the second dot formation determining section determines whether or not any one of the dots having each density should be formed at the position where the first dot formation determining section determined that a dot should not be formed. This means that the second dot formation determining section also uses the method of comparison with the dither matrix, or the so-called dither method. Further, the value obtained by simple correction of the dither matrix of the first dot formation determining section is used, thereby saving the storage capacity of a memory to be used.

(4) The image forming apparatus described in any one of Features (1) through (3), wherein two or more types of dots having different densities per unit area have a resultant value corresponding to each density; the aforementioned image forming apparatus further comprising:

an error calculation section for calculating an error between this resultant value and the corrected pixel value obtained by correcting the input pixel value using the neighboring error diffused from processed pixels; and an error diffusion section for assigning a weight to the error caused by the aforementioned error calculation section and diffusing it to the neighboring unprocessed pixels;

wherein at least one type of the dots used by the second dot formation determining section determines, based on the result of comparison between the corrected pixel value and a second predetermined, whether or not a dot should be formed.

According to the Feature (4), in the image forming apparatus, two or more types of dots having different densities per unit area have a resultant value corresponding to each density. The image forming apparatus further comprises an error calculation section for calculating an error between this resultant value and the corrected pixel value obtained by correcting the input pixel value using the neighboring error diffused from processed pixels; and a error diffusion section for assigning a weight to the error caused by the error calculation section and diffusing it to the neighboring unprocessed pixels. Based on the result of comparison between the corrected pixel value and a second predetermined, at least one type of the dots used by the second dot formation determining section determines whether or not a dot should be formed. Accordingly, especially when the resultant value of the dot used by the first dot formation determining section is greater than that of the dot used by the second dot formation determining section, the dot used by the second dot formation determining section does not easily appear around the dot used by the first dot formation determining section. This provides excellent diffusion properties in terms of the dots having a higher density together with those having a lower density.

(5) The image forming apparatus described in any one of Features (1) through (4), wherein the dither matrix is of a Bayer type.

According to the Feature (5), the dither matrix is of a Bayer type. This arrangement saves the storage capacity of a memory, and allows the threshold value to be created easily.

(6) The image forming apparatus described in any one of Features (1) through (4), wherein a blue noise mask method is used to determine, by using the dither matrix, whether or not a dot should be formed.

According to the Feature (6), the blue noise mask method is used to determined if the dot using the dither matrix should be formed or not. This arrangement allows the dots used by the first dot formation determining section to have a blue noise property. Further, the blue noise property is also exhibited in the dot arrangement wherein the dots used by the first dot formation determining section are added to those used by the second dot formation determining section. Hence this arrangement improves both the diffusion of the dots used by the first dot formation determining section, and the diffusion of the dots used by the first dot formation determining section plus the dots used by the second dot formation determining section.

(7) The image forming apparatus described in any one of Features (1) through (6), wherein the predetermined value in the dither matrix is changed in response to printing resolution.

According to the Feature (7), a predetermined value in the dither matrix is changed in response to printing resolution. This arrangement makes it possible to change the value wherein the dots used by the first dot formation determining section start to appear.

For example, when the printing resolution is low, unless the first dots as large or dark dots used by the first dot formation determining section are frequently used, many gaps will be formed on the recording medium, with the result that the density will be insufficient. To solve this problem, when the printing resolution is low, the predetermined value is reduced so that the dot used by the first dot formation determining section will appear earlier.

(8) The image forming apparatus described in any one of Features (1) through (7), wherein the predetermined value in the dither matrix is changed in response to the recording mode.

According to the Feature (8), the predetermined value in the dither matrix is changed in response to the recording mode. This arrangement makes it possible to change the value wherein the dots used by the first dot formation determining section start to appear.

For example, in the high image quality mode, to reduce the degree of graininess, the dots as small or light dots used by the second dot formation determining section must be frequently used. Thus, in the high image quality mode, the predetermined value is increased so that the dots used by the first dot formation determining section do not easily appear.

(9) The image forming apparatus described in any one of Features (1) through (8), wherein the predetermined value in the dither matrix is changed in response to the type of the recording medium.

According to the Feature (9), the predetermined value in the dither matrix is changed in response to the type of the recording medium. This arrangement makes it possible to change the value wherein the dots used by the first dot formation determining section start to appear.

For example, plain paper has a lower ink absorbing capacity than special-purpose paper. When such a recording medium is used, the amount of ink must be reduced. In this case, the dots as large dots used by the first dot formation determining section are mixed in the stage of a lower graduation value. This procedure provides the required density, despite a small amount of ink, thereby saving the overall amount of ink. Thus, when plain paper is used as a recording medium, the predetermined value is set to a small value so that the dots used by the first dot formation determining section will be produced earlier.

(10) An image forming method for forming an image by the distribution of two or more types of dots having different densities per unit, comprising:

a first dot formation determining step, for making comparison between the pixel value in the target pixel on the input image and the dither matrix stored in advance, and for determining, based on the result of this comparison, whether or not the dot having the highest density, out of two or more types of dots having the different densities per unit area, should be formed at the position corresponding to the aforementioned target pixel;

a second dot formation determining step for determining whether or not a dot whose density per unit area is lower than that of the dot used in the first dot formation determining step should be formed at the position where the first dot formation determining step has determined that the dot should not be formed; and a dot formation instructing step for instructing, based on the result of determination by the first and second dot formation determining steps, whether or not a dot should be formed at the position corresponding to the aforementioned target pixel;

wherein the aforementioned dither matrix is composed of values each of which is equal to or greater than a predetermined value greater than 0 and smaller than the maximum value taken by the pixel value of the input image.

According to the image forming apparatus described in Feature (10), based on the result of comparison between the pixel value in the target pixel on the input image and the dither matrix composed of values each of which is equal to or greater than a predetermined value greater than 0 and smaller than the maximum value taken by the pixel value of the input image, the first dot formation determining step determines whether or not the dot having a higher density per unit area should be formed. This function allows the dot ratio to be controlled, for example, in such a way that the first dot formation determining step prevents a dot from being produced at least until the pixel value exceeds the predetermined level. Further, in the pixel value equal to or greater than the predetermined level, this function restricts the position of the pixel where the dot is forcibly produced in response to the dither matrix, and hence controls the diffusion of a visibly conspicuous dot of high density. Further, only when it has been determined that a dot is not formed by the first dot formation determining step, decision is made by the second dot formation determining step. This arrangement cuts down processing time.

(11) An image forming program, for forming an image using the distribution of two or more types of dots having different densities per unit area, comprising:

a first dot formation determining function, for making comparison between the pixel value in the target pixel on the input image and the dither matrix stored in advance, and for determining, based on the result of this comparison, whether or not the dot having the highest density, out of two or more types of dots having the different densities per unit area, should be formed at the position corresponding to the aforementioned target pixel;

a second dot formation determining function for determining whether or not a dot whose density per unit area is lower than that of the dot used in the first dot formation determining function should be formed at the position where the first dot formation determining function has determined that the dot should not be formed; and a dot formation instructing function for instructing, based on the result of determination by the first and second dot formation determining functions, whether or not a dot should be formed at the position corresponding to the aforementioned target pixel;

wherein the aforementioned dither matrix is composed of values each of which is equal to or greater than a predetermined value greater than 0 and smaller than the maximum value taken by the pixel value of the input image.

According to the image forming program described in Feature (11), based on the result of comparison between the pixel value in the target pixel on the input image and the dither matrix composed of values each of which is equal to or greater than a predetermined value greater than 0 and smaller than the maximum value taken by the pixel value of the input image, the first dot formation determining function determines whether or not the dot having a higher density per unit area should be formed. This function allows the dot ratio to be controlled, for example, in such a way that the first dot formation determining function prevents a dot from being produced at least until the pixel value exceeds the predetermined level. Further, in the pixel value equal to or greater than the predetermined level, this function restricts the position of the pixel where the dot is forcibly produced in response to the dither matrix, and hence controls the diffusion of a visibly conspicuous dot of high density. Further, only when it has been determined that a dot is not formed by the first dot formation determining function, the second dot formation determining function is used. This arrangement cuts down processing time.

PREFERRED EMBODIMENT OF THE INVENTION

Referring to the drawings, the following describes the image forming apparatus image forming method and image forming program of the present invention, without the present invention being restricted to the examples given in the drawings.

Embodiment 1

In the first place, the first embodiment will be described with reference to FIGS. 1 through 5.

FIG. 1 is a block representing the schematic configuration of an image forming apparatus 1 as a first embodiment of the present invention;

The image forming apparatus 1 can be mounted on an output apparatus (image recording section) such as an inkjet printer known in the prior art. It quantizes, for each pixel, the input value composed of multi-gradation image data where each pixel constituting the image is assigned with the image data having a predetermined number of bits (a predetermined number of gradations), and converts the result into the output value composed of pseudo-halftone image data.

As shown in FIG. 1, the image forming apparatus 1 is equipped with an image forming section 5. The image forming section 5 is provided with:

a first dot formation determining section 51 for implementing the first dot formation determining function in the first dot formation determining step to be described later;

a second dot formation determining section 52 for implementing the second dot formation determining function in the second dot formation determining step; and a dot formation instruction section 53 for implementing the dot formation determining function in the dot formation instructing step.

The image forming apparatus 1 comprises a CPU (Central Processor Unit) 2, ROM (Read Only Memory) 3, RAM (Random Access Memory) 4, input section 6, and output section 7. In the image forming apparatus 1, an image forming program for processing the image data is stored in the ROM 3. Using the RAM 4 as a work area, each section step of the image forming section reads out the image forming program stored in the ROM 3 and implements various forms of processing equipped with the aforementioned functions according to the image forming program. To put it another way, the image forming program allows the image forming apparatus to implement various forms of processing to be described later.

The following describes the image forming method as the first embodiment.

In the first place, the following describes the method for forming two or more types of dots having different densities per unit area for one hue: The method for forming two or more types of dots having different densities per unit area includes the method of changing the density of the ink for each dot, and the method for changing the diameter of each dot.

In one of the examples for the method of changing the ink density, inks of light color and dark colors are prepared in advance, and each of these inks is emitted from a different head. One and the same head is equipped with a nozzle for emitting each type of ink. Further, liquid ink is used in some cases, while a dark colored ink and transparent ink are used to get a light color, in other cases.

The dot diameter is changed, for example, when the cycle of driving the inkjet printer head is adjusted to change the dot diameter (ink particle size). To put it another way, if the drive cycle is short, the dot diameter is reduced. If the drive cycle is long, the dot diameter is increased in proportion to the length thereof. It is also possible to arrange such a configuration that a nozzle for forming dots having different diameters is provided in one and the same head, or a head equipped with the nozzle for forming dots having different diameters is arranged in advance.

In the present embodiment described below, image processing compatible with an inkjet printer will be taken up for explanation, wherein the head drive cycle is adjusted and two types of dot diameters (large and small dots) is formed for each color.

Figure 2:
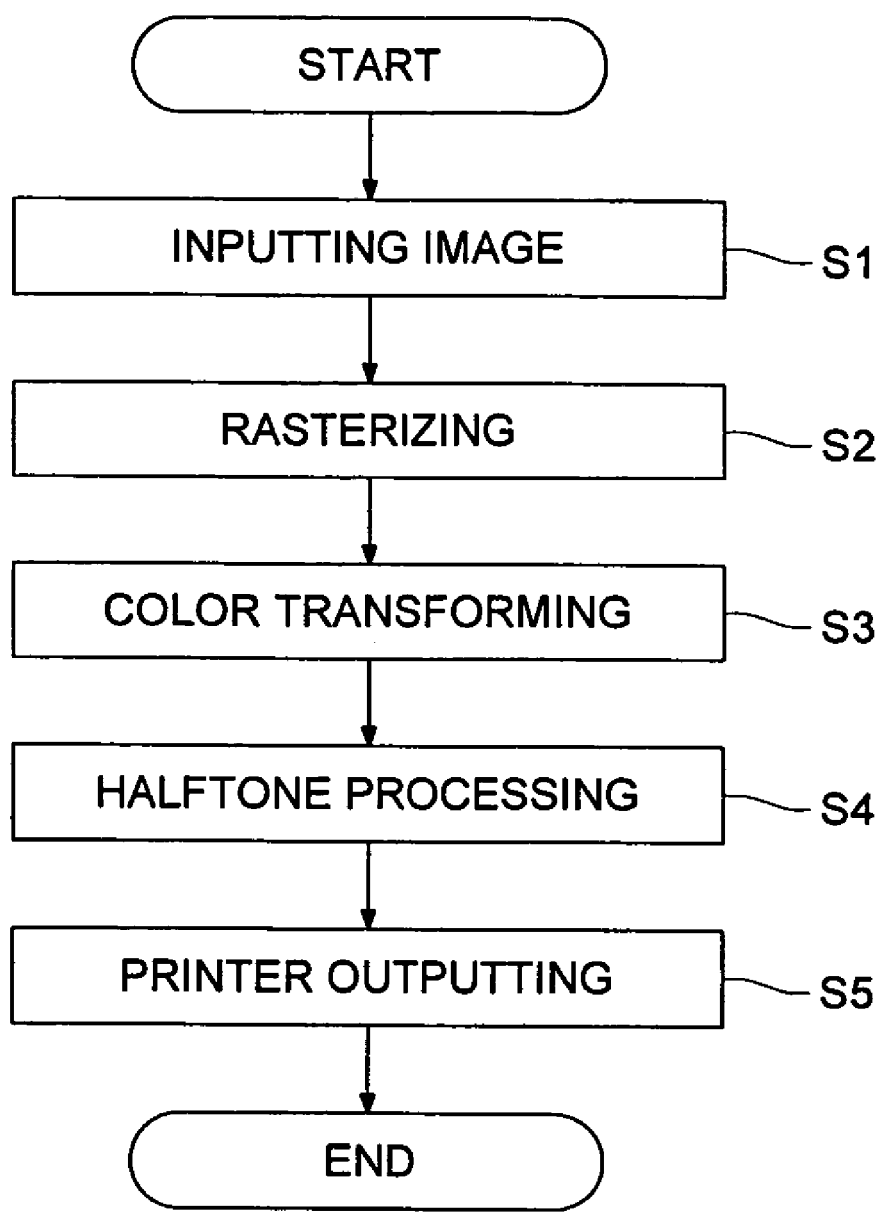
FIG. 2 is a flowchart representing a flow from the input of an original image to the output of the output image.

Referring to the flowchart given in FIG. 2, the following describes the flow of operations ranging from inputting of an original image to outputting by a printer.

The image data composed of multi-gradation image data (pixel value of input image) is inputted into the RAM 4 of the image forming apparatus 1 (Step S1), and the inputted image is converted from the vector data into the raster data (rasterization), as required (Step S2).

Then color conversion is carried out in conformity to the printer used for printing (Step S3). To put it more specifically, the color composed of red, green and blue (RGB) given on the display is converted into data of CMY(K)—cyan, magenta, yellow and (black)—in order to print it on reflective media.

Based on this data, halftone processing (details to be described later) is performed (Step S4). The type and arrangement of dots are determined by halftone processing. In the image subsequent to color conversion, processing is carried out for each pixel by forward scanning or zigzag scanning.

After halftone processing as described above, the output is printed by the printer (printing process) (Step S5).

Figure 3:
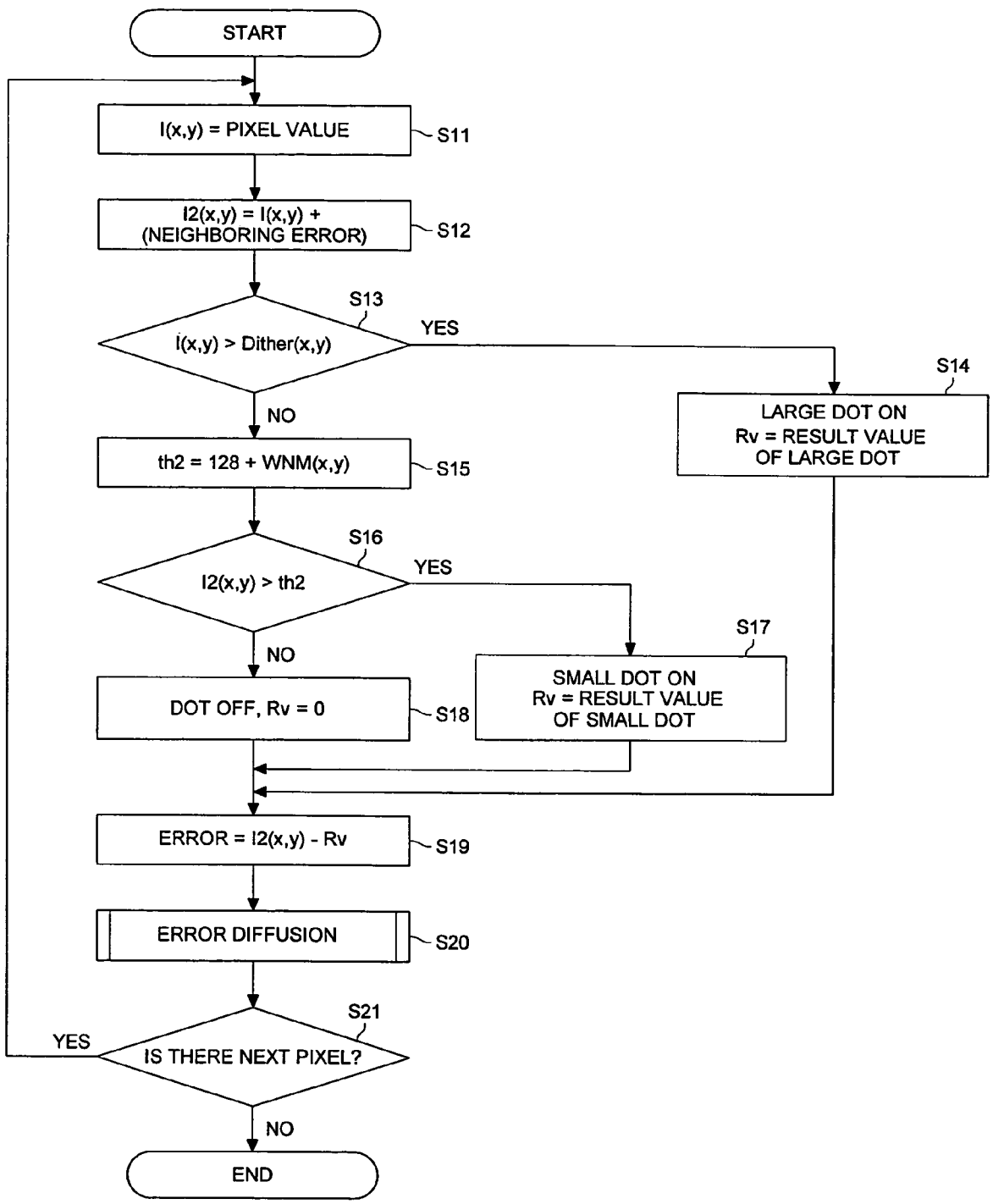
FIG. 3 is a flowchart representing the halftone processing in the first embodiment.

Referring to the flowchart of FIG. 3, the following describes the halftone processing in Step S4:

FIG. 3 is a flowchart representing the halftone processing in an inkjet printer for forming two types of dots (large and small dots) for the ink of each color.

The first dot formation determining step is performed by the first dot formation determining section (the first dot formation determining function of the image forming program) 51. Dither processing is employed in the first dot formation determining step. Here the dither (x, y) denotes the dither matrix arranged in advance. In the present embodiment, so-called Bayer type dither matrix is used. This matrix has a size of 16×16 pixels. The input image is composed of 8 bits (composed of 0 through 255 values), and a predetermined value to be described later is 150. Accordingly, the input pixel value and a predetermined value are added up, and the gradation value of 150 through 405 is included. It should be noted, however, that the dither matrix is not restricted thereto. In the present embodiment, arrangements are made in such a way as to calculate the remainder obtained by dividing x by 16 and the remainder obtained by dividing y by 16, with respect to the pixel position (x, y), whereby the dither value "dither" (x % 16, y % 16) is obtained.

The pixel value (input pixel value) in the predetermined target pixel is set to I (x, y) (Step S11). The correction pixel value obtained by adding to this pixel value I (x, y) the neighboring error dispersed from the processed pixel by the error calculation section and error diffusion section to be described later is set to I2 (x, y) (Step S12).

I (x, y) is compared with the value of dither matrix th1=Dither (x, y) stored in advance (Step S13). When the input image is composed of n bits of data, the aforementioned dither matrix is composed of values each of which is equal to or greater than a predetermined value greater than 0 and smaller than the maximum value $2^n$ taken by the pixel value of the input image. To put it another way, in the present embodiment, the input image is composed of 8 bits. Accordingly, the predetermined value is greater than 0 and smaller than 256. To put it more specifically, the predetermined value is 150. Thus, this predetermined value makes it possible to adjust the pixel value wherein large dots appear, and hence to control the recorded ratio of the large and small dots. If, as a result of this calculation, it has been determined that I (x, y) is greater than the threshold value th1, then the large dot is turned on, and the resultant value of the large dot (512 in this case) is substituted into the resultant value Rv (Step S14).

Conversely, when it has been determined that pixel value I (x, y) is smaller than th1, the system goes to the second dot formation determining step implemented by the second dot formation determining section (second dot formation determining function of the image forming program) 52. This second dot formation determining step utilizes the processing of error diffusion.

In the first place, calculation is made to get the threshold value th2 used in the second dot formation determining step (Step S15). Since 8-bit processing is applied, the threshold value is gained by adding a white noise matrix WNM (x, y) to 128. This white noise is used to resolve the specific pattern that appears when the dot ratio (number of recorded dots/number of recordable pixels) stands in the vicinity of 33% or 50%.

The th2 calculated in the aforementioned manner is compared with I2 (x, y) (Step S16). If the I2 (x, y) is greater than th2, the small dot is turned on, and the resultant value (255 in this case) of the small dot is substituted into the Rv (Step S17). If the I2 (x, y) is smaller than th2, the dot is turned off, and 0 is substituted into the Rv (Step S18).

After that, error calculation, I2 (x, y)−Rv, is carried out by the error calculation section (Step S19). Then a weight is assigned to the error for diffusion to unprocessed neighboring pixels (Step S20).

A decision step is taken to determine if there is the next pixel or not (Step S21). Upon processing of all pixels, halftone processing terminates. Lastly, the dot formation instructing section issues an instruction to all pixels to instruct which dots should be formed and which dots should not be formed. The image recording section records (outputs) the image.

Figure 4:
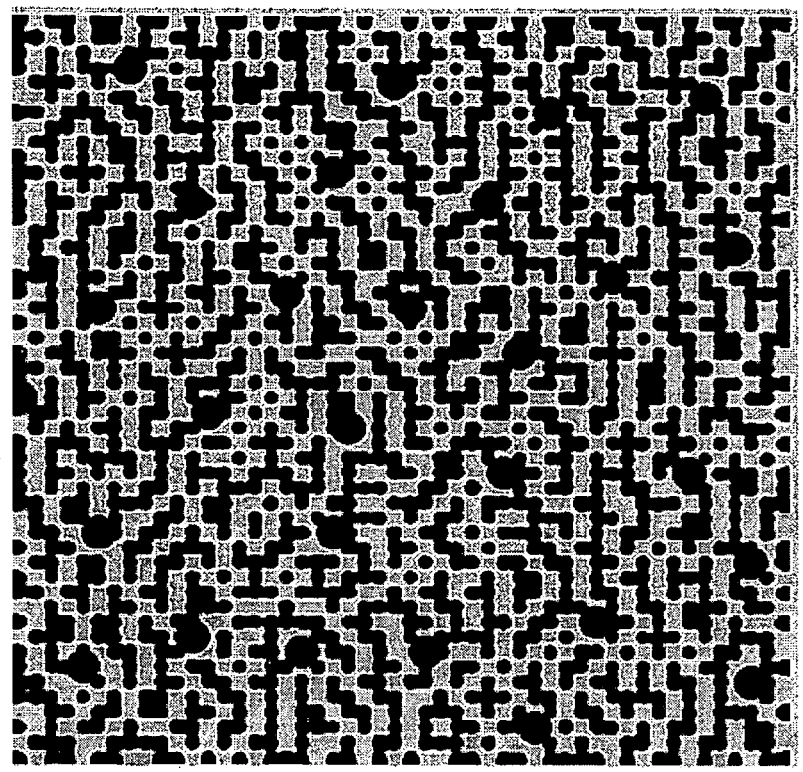
FIG. 4 is an image diagram showing the result of halftone processing in the first embodiment.

FIG. 4 shows an example of the image obtained from the aforementioned processing. As can be seen from FIG. 4, large dots exhibit good dispersion and, as a result, overall dot dispersion is excellent.

Figure 5:
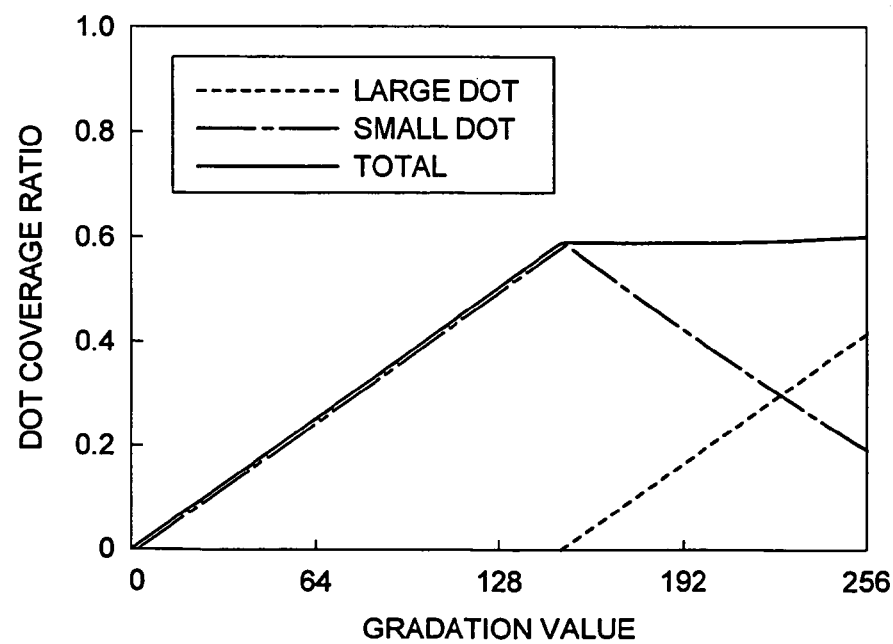
FIG. 5 is a chart representing an example of the table for determining the percentage of large and small dots with respect to the gradation value in the first embodiment.

Assume that the input value is given in terms of an 8-bit value, the predetermined value is 150, the resultant value of a large dot is 512, and that of a small dot is 255. Then large dots can be mixed before the dot coverage ratio the small dots reaches 100%, as shown in FIG. 5. As can be seen from FIG. 5, the ratio of small dots is reduced by the occurrence of large dots. This is because an error is resolved by large dots having been forced to appear, with the result that small dots cannot easily appear.

The following describes an example of the variation of first embodiment:

In the first embodiment, the dither matrix dither (x, y) has an increment (dot coverage ratio/gradation value) of 1/255 with respect to the gradation value. This arrangement allows the dither (x, y) to express all the 8-bit gradation areas.

Figure 6:
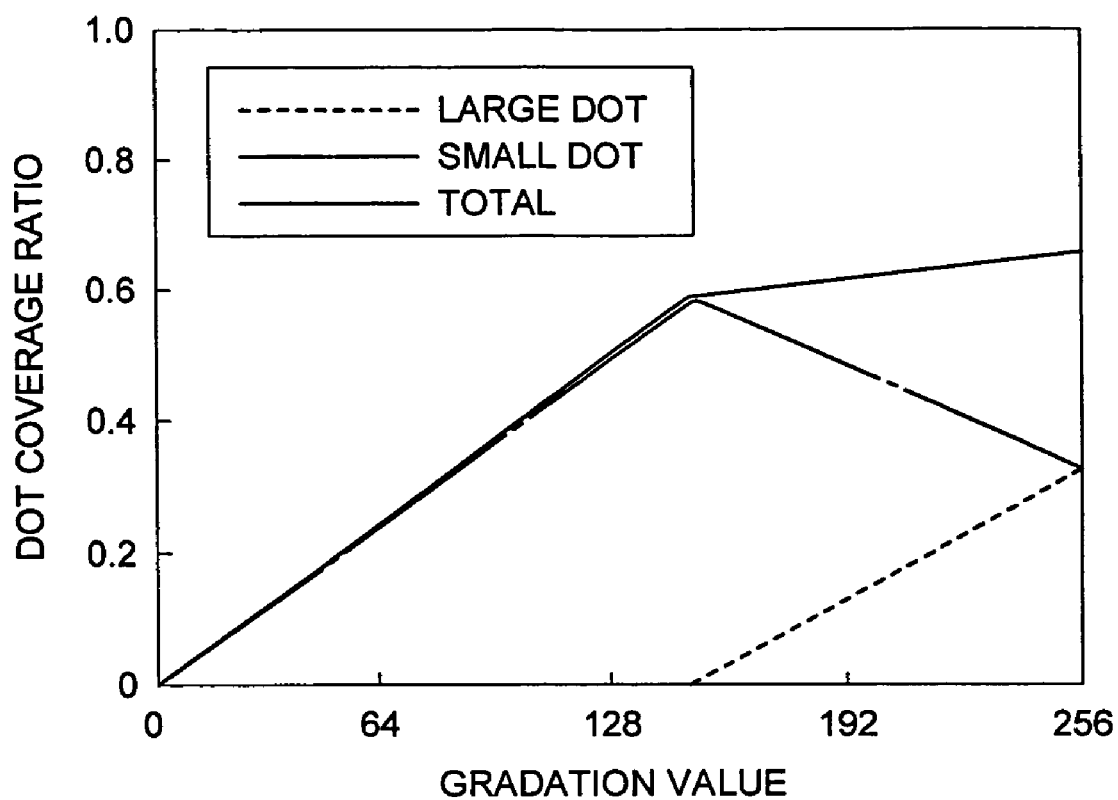
FIG. 6 is a chart representing an example of the table for determining the percentage of large and small dots with respect to the gradation value in a variation example of the first embodiment.

FIG. 6 shows the dot coverage ratio, assuming that the percentage of the increase in the gradation value as an example of the variation is equal to or smaller than 1/255, in this case. As can be seen from FIG. 6, there is a reduction in the percentage of increase in the dots (large dots in this case) determined in Step S13, as a result. This causes a reduction in the small dot ratio. Thus, the total of the ratios of both large and small dots continues to increase after the large dots have started to appear. Further, in this example of the variation, the dither matrix undergoes a linear change, and therefore a reverse point is provided when the large dots have started to appear. When each component of the dither matrix is subjected to nonlinear conversion and the start of appearance of the large dots is inserted in terms of a curve, the reverse point at the peak of the small dot is resolved, and the spurious profile at the start of the appearance of large dots is placed under control. Further, when the difference in the resultant value of large dots and that of small dots is increased, it is possible to control the percentage in the reduction of small dots, caused by an increase of the large dots. Thus, the overall dot ratio can be controlled by adequate control of the values in the dither matrix in the first embodiment.

It is also possible to make such arrangements that the predetermined value in the dither matrix is changed in response to the printing resolution. This makes it possible to change the value wherein the dot used in the first dot formation determining section start to appear.

For example, when the printing resolution is low, if the dots used by the first dot formation determining section as large dots or dark dots are not used frequently, many gaps will be produced on a recording medium, with the result that density will be insufficient. To prevent this, if the printing resolution is low, the predetermined value is reduced so that the dots used in the first dot formation determining section will appear earlier.

It is also possible to arrange such a configuration that the predetermined value in the dither matrix is changed in response to the recording mode. This will make it possible to change the value wherein the dots used in the first dot formation determining section start to appear.

For example, in the high-quality image mode, the dots used by the second dot formation determining section as small dots or light dots must be frequently employed in order to decrease the graininess. Thus, in the high-quality image mode, the predetermined value is increased so that the dots used in the first dot formation determining section do not appear easily.

It is also possible to arrange such a configuration that the predetermined value in the dither matrix is changed according to the type of the recording medium. This will make it possible to change the value wherein the dots used in the first dot formation determining section start to appear.

For example, plain paper has a lower ink absorbing capacity than special-purpose paper. When such a recording medium is used, the amount of ink must be reduced. In this case, the dots as large dots used by the first dot formation determining section are mixed in the stage of a lower graduation value. This procedure provides the required density, despite a small amount of ink, thereby saving the overall amount of ink. Thus, when plain paper is used as a recording medium, the predetermined value is set to a small value so that the dots used by the first dot formation determining section will be produced earlier.

Embodiment 2

Figure 7:
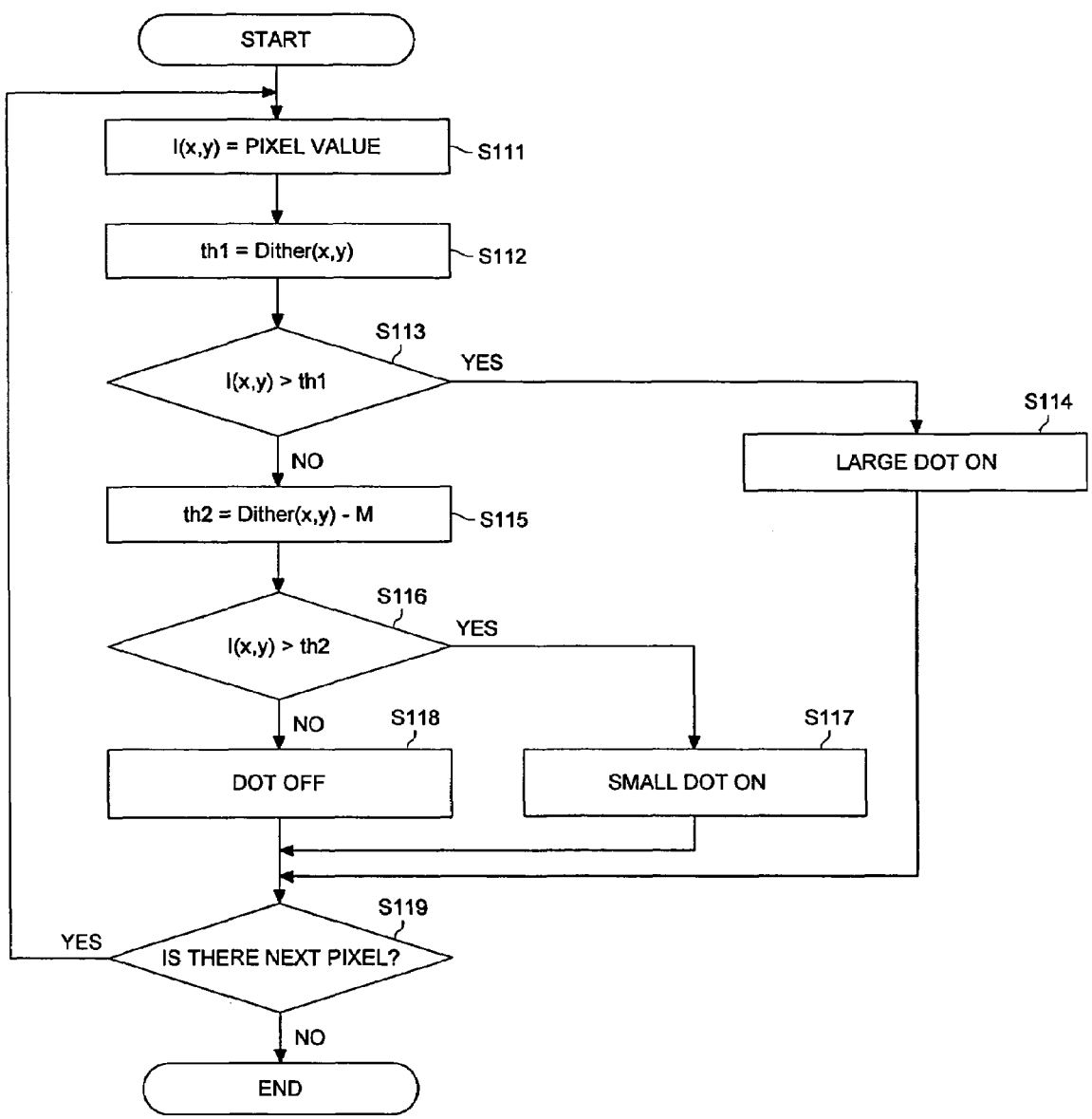
FIG. 7 is a flowchart representing the halftone processing in the second embodiment.

The following describes the image forming method as a second embodiment:

The second embodiment is the same as the first embodiment except that the aforementioned halftone processing in Step S4 is applied in the manner shown in the flowchart of FIG. 7. The following will omit the description of the same processing and structure.

Referring to the flowchart of FIG. 7, the following describes the processing of halftone in the image forming method as the second embodiment:

This method is the same as that shown in the description of the first embodiment except that dither processing is applied in the second dot formation determining section.

The first dot formation determining step is performed by the first dot formation determining section (the first dot formation determining function of the image forming program) 51. Dither processing is employed in the first dot formation determining step (Step S11).

The pixel value in the predetermined target pixel is assumed as I (x, y). Then the value of the dither matrix for storing the I (x, y) in advance is assumed as th1=Dither (x, y) (Step S112). The I (x, y) is compared with the th1 (Step S113). When the input image is composed of n bits of data, the aforementioned dither matrix is composed of values each of which is equal to or greater than a predetermined value greater than 0 and smaller than the maximum value $2^n$ of the input image. To put it another way, in the present embodiment, the input image is composed of 8 bits. Accordingly, the predetermined value is greater than 0 and smaller than 256. To put it more specifically, the predetermined value is 150. Thus, this predetermined value makes it possible to adjust the pixel value wherein large dots appear, and hence to control the recorded ratio of the large and small dots. If, as a result of this calculation, it has been determined that I (x, y) is greater than the threshold value th1, then the large dot is turned on (Step S114).

Conversely, when it has been determined that pixel value I (x, y) is smaller than th1, the system goes to the second dot formation determining step implemented by the second dot formation determining section (second dot formation determining function of the image forming program) 52 shown in FIG. 1. This second dot formation determining step of the present embodiment utilizes dither processing.

In the first place, calculation is made to get the threshold value th2 used in the second dot formation determining step (Step S115). The value obtained by subtracting a fixed value M (150 in this case) from the same dither value used in Step S112 is assumed as th2 (Step S115). Then the I (x, y) is compared with the th2 (Step S116).

If the I (x, y) is larger, small dots are turned on. (Step S117). If I (x, y) is smaller, small dots are turned off (Step S118).

Then a decision step is taken to determine if there is the next pixel or not (Step S119). Upon processing of all pixels, halftone processing terminates. Lastly, the dot formation instructing section 53 issues an instruction to all pixels to instruct which dots should be formed and which dots should not be formed. The image recording section records (outputs) the image.

Figure 8:
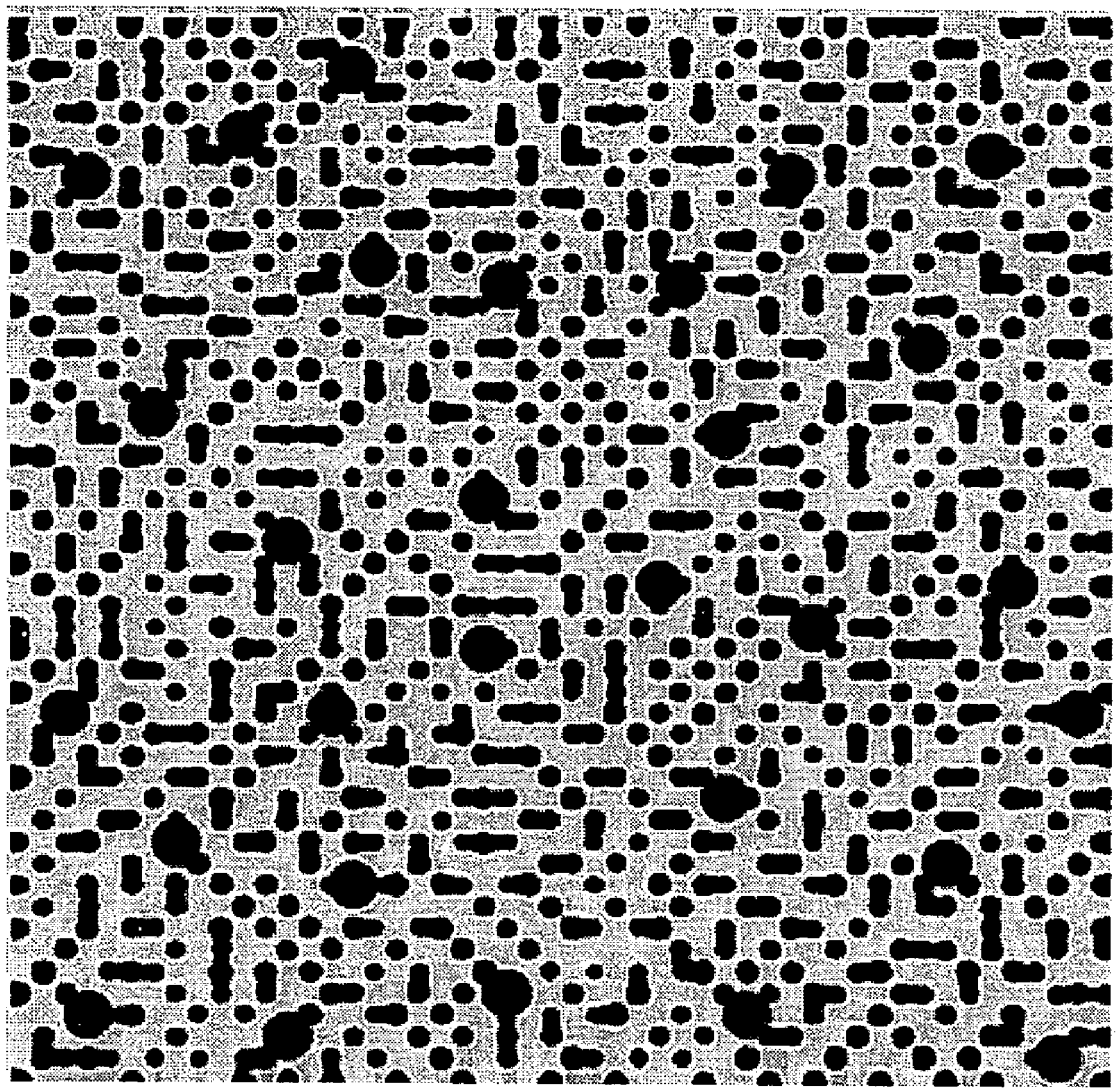
FIG. 8 is an image diagram showing the result of halftone processing in the second embodiment.

FIG. 8 shows an example of the image obtained from the aforementioned processing. As can be seen from FIG. 8, large dots exhibit good dispersion and, as a result, overall dot dispersion is excellent in this embodiment as well.

If the matrix having such a value that enables dot dispersion wherein a blue noise property is present in almost all the gradation area is used as the dither matrix, both large and small dots are processed in the same matrix. The dispersion of both large and small dots exhibits a blue noise-like dot dispersion. Further, the dispersion of the large and small dots also exhibit a blue noise-like dot dispersion. This arrangement provides high image quality, without dots interfering with each other.

Figure 9:
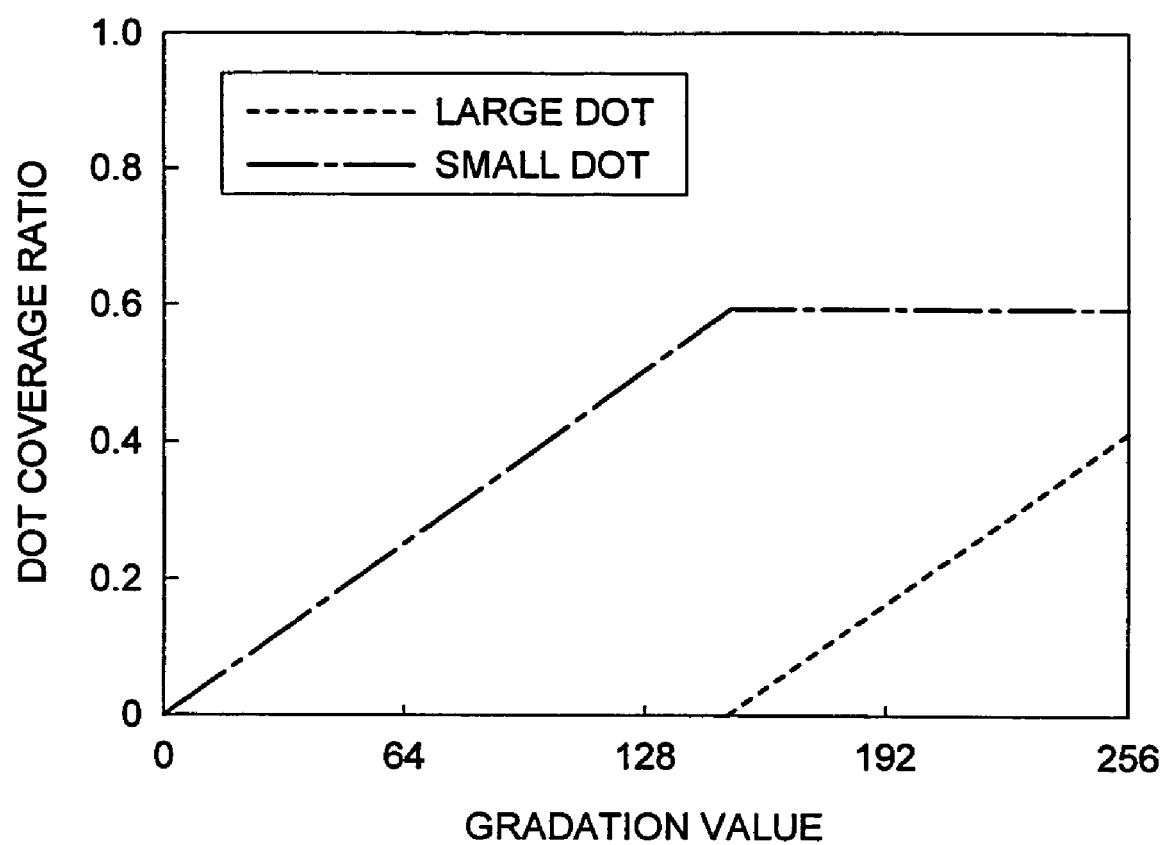
FIG. 9 is a chart representing an example of the table for determining the percentage of large and small dots with respect to the gradation value in the second embodiment.

The dot ratio that can be achieved in this method is shown in FIG. 9. Such a dot ratio is provided by the following reason: Since the same dither matrix is used by the large and small dots, the large dots occupy the position of the small dots. Thus, the increase of the small dots is discouraged. Such a dot ratio is very effective in keeping the small dot ratio below a fixed level.

Embodiment 3

The third embodiment refers to the processing of halftone in the inkjet printer for forming three sizes of dots (large, medium and small) for the ink of various colors. The following will omit the description of the same processing and structure as those of the second embodiment.

Figure 10:
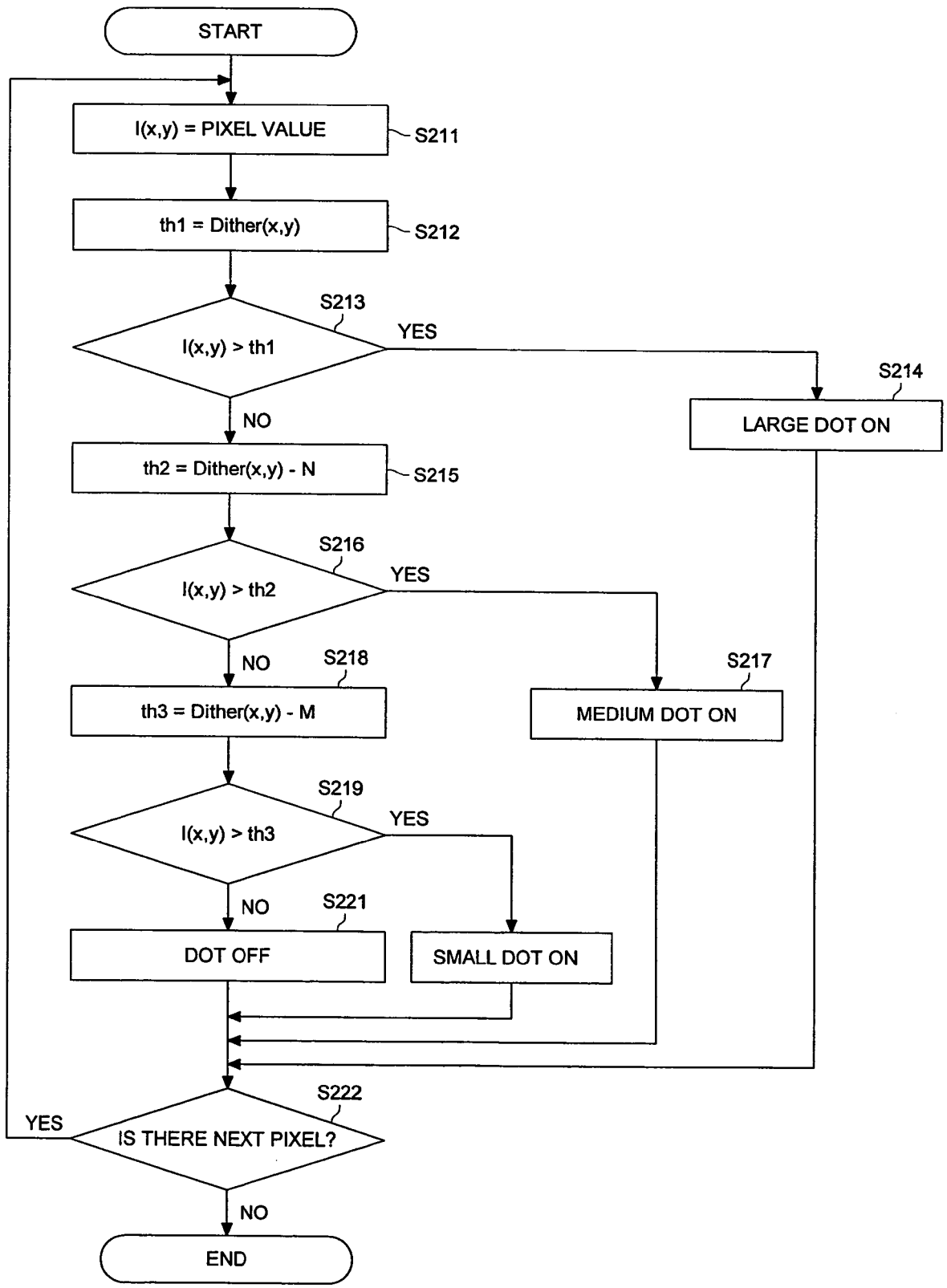
FIG. 10 is a flowchart representing the halftone processing in the third embodiment.

The following describes the halftone processing in the image forming method as a third embodiment, with reference to the flowchart of FIG. 10:

The first dot formation determining step is performed by the first dot formation determining section (the first dot formation determining function of the image forming program) 51. Dither processing is employed in the first dot formation determining step.

The pixel value in the predetermined target pixel is assumed as I (x, y) (Step S211). Then the value of the dither matrix for storing the I (x, y) in advance is assumed as th1=Dither (x, y) (Step S212). The I (x, y) is compared with the th1 (Step S213). When the input image is composed of n bits of data, the aforementioned dither matrix is composed of values each of which is equal to or greater than a predetermined value greater than 0 and smaller than the maximum value $2^n$ of the input image. To put it another way, in the present embodiment, the input image is composed of 8 bits. Accordingly, the predetermined value is greater than 0 and smaller than 256. To put it more specifically, the predetermined value is 150. Thus, this predetermined value makes it possible to adjust the pixel value wherein large dots appear, and hence to control the recorded ratio of the large, medium and small dots. If, as a result of this calculation, it has been determined that I (x, y) is greater than the threshold value th1, then the large dot is turned on (Step S214).

Conversely, when it has been determined that pixel value I (x, y) is smaller than th1, the system goes to the second dot formation determining step implemented by the second dot formation determining section (second dot formation determining function of the image forming program) 52 shown in FIG. 1. This second dot formation determining step of the present embodiment utilizes dither processing. In the present embodiment, two second dot formation determining sections are provided, and one of them is used to carry out the following processing:

In the first place, calculation is made to get the threshold value th2 used in the second dot formation determining step (Step S215). The value obtained by subtracting a fixed value N (82 in this case) from the same dither value used in Step S212 is assumed as th2. Then the I (x, y) is compared with the th2 (Step S216). If the I (x, y) is larger, medium dots are turned on (Step S217).

Conversely, when it has been determined that pixel value I (x, y) is smaller than th2, the system goes to the other of the two second dot formation determining steps implemented by the second dot formation determining section (second dot formation determining function of the image forming program) 52 shown in FIG. 1. These second dot formation determining steps of the present embodiment utilize dither processing.

In the first place, calculation is made to get the threshold value th3 used in the second dot formation determining step (Step S218). The value obtained by subtracting a fixed value M (210 in this case) from the same dither value used in Step S212 is assumed as th3. Then the I (x, y) is compared with the th3 (Step S219). If the I (x, y) is larger, small dots are turned on. (Step S20). If it is smaller, dots are turned off (Step S221).

The following relationship holds among the predetermined value (210 in this case), the fixed value M (210 in this case) and the fixed value N (82 in this case):

$$\text{the predetermined value} \geq M > N$$

A decision step is taken to determine if there is the next pixel or not (Step S222). Upon processing of all pixels, halftone processing terminates. Lastly, the dot formation instructing section issues an instruction to all pixels to instruct which dots should be formed and which dots should not be formed. The image recording section records (outputs) the image.

Figure 11:
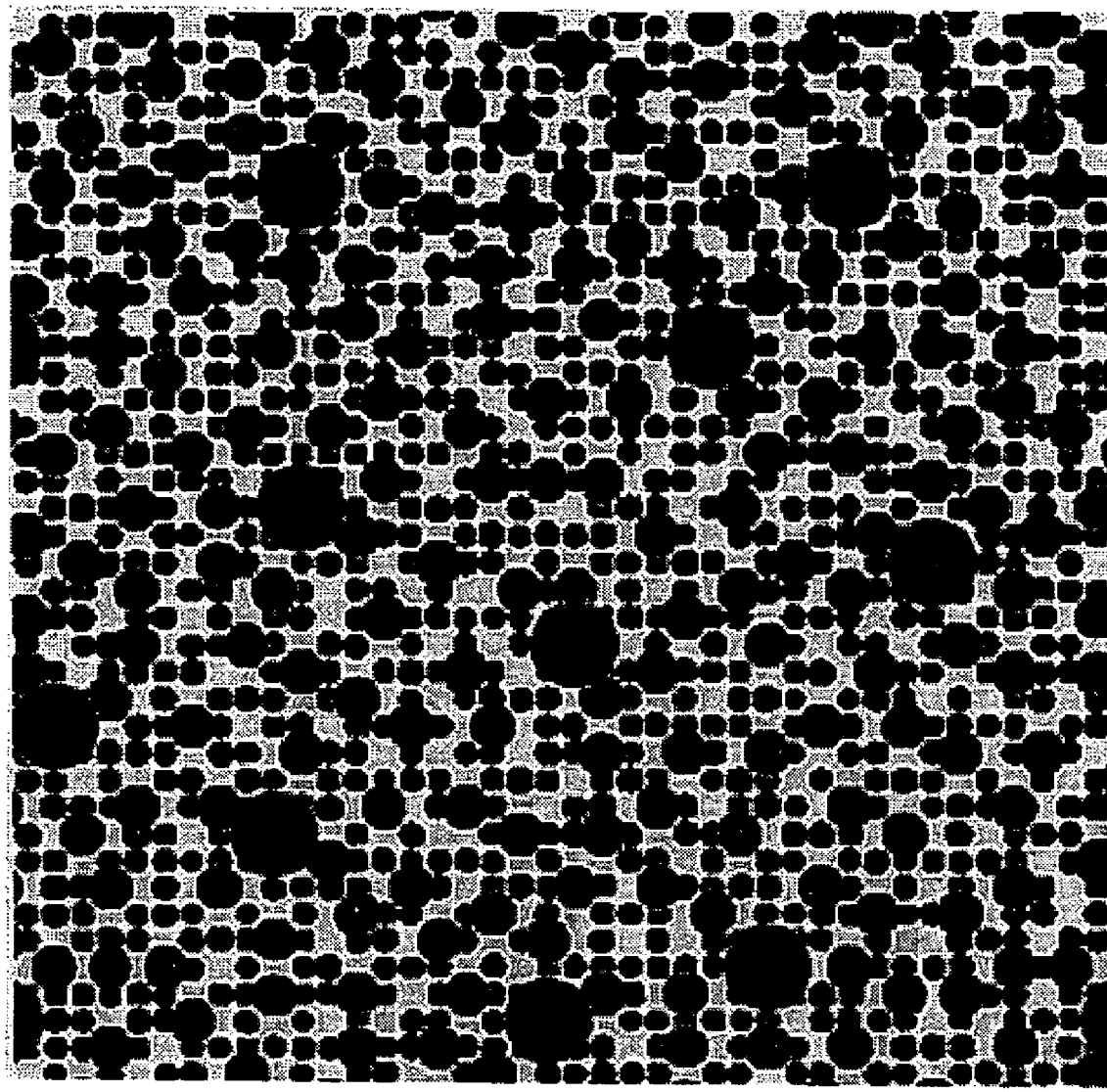
FIG. 11 is an image diagram showing the result of halftone processing in the third embodiment.

FIG. 11 shows an example of the image obtained from the aforementioned processing. As can be seen from FIG. 11, large and medium dots exhibit good dispersion. As a result, overall dot dispersion is also excellent.

If the matrix having such a value that enables dot dispersion wherein a blue noise property is present in almost all the gradation area is used as the dither matrix, large, medium and small dots are processed in the same matrix. The dispersion of large, medium and small dots exhibits a blue noise-like dot dispersion. Further, the distribution of the large and medium dots also exhibit a blue noise-like dot dispersion. This arrangement provides high image quality, without dots interfering with one another.

Figure 12:
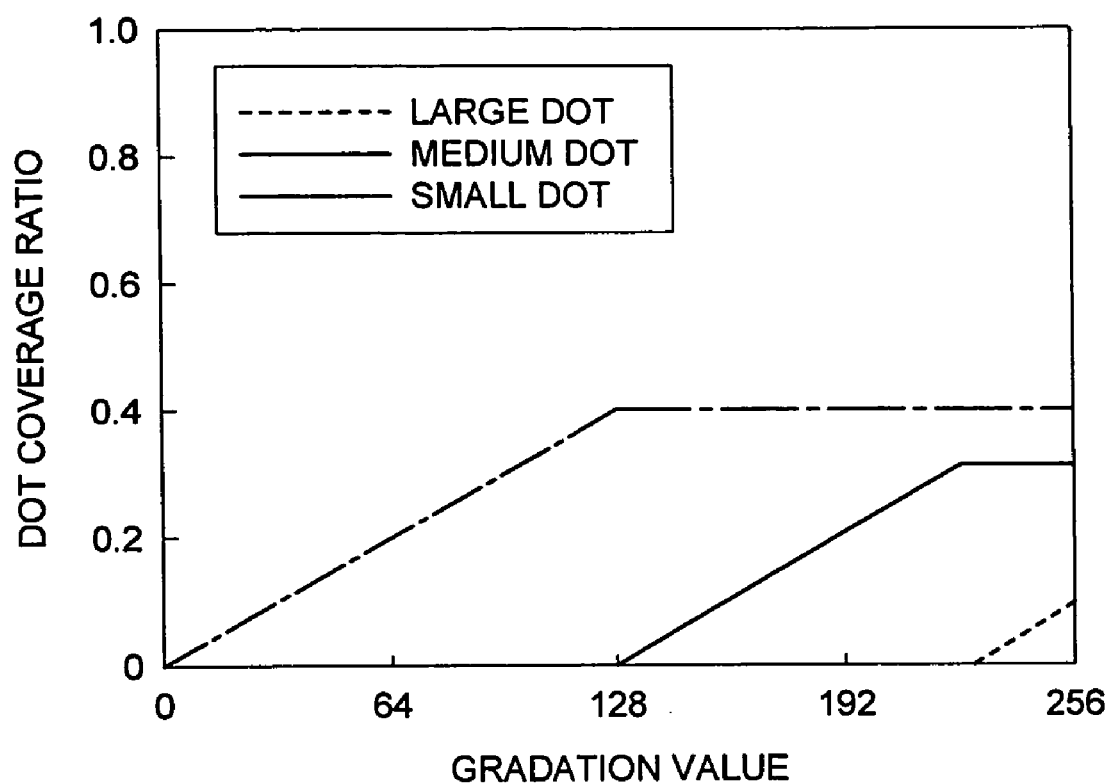
FIG. 12 is a chart representing an example of the table for determining the percentage of large, medium and small dots with respect to the gradation value in the third embodiment.

The dot ratio that can be achieved in this method is shown in FIG. 12. Such a dot ratio is provided by the following reason: Since the same dither matrix is used by the large, medium and small dots, the large dots occupy the positions of the medium and small dots, and the medium dots occupy the positions of small dots, thereby discouraging the increase of the small dots. Such a dot ratio is very effective in keeping the small dot ratio below a fixed level. FIG. 12 shows the distribution of dots actually printed when the third embodiment is implemented based on M=210 and N=82. The maximum ratio of the small and medium dots can be controlled by changing the M and N.

In the third embodiment, all three types of dots (large, medium and small dots) are formed by dither processing. Without being restricted thereto, the present embodiment can be arranged in such a way that large and medium dots are formed by dither processing and only the small dots are formed by error dispersion. Similarly, when four or more dots are formed, the present embodiment can be arranged in such a way that all types of dots are formed by dither processing, or only the dots processed in the last step are formed by error dispersion.

As described above, in the image forming apparatus of the aforementioned embodiments, the first dot formation determining section determines if the dot having the higher density per unit area should be formed or not, based on the result of comparison between the pixel value in the target pixel on the input image and the dither matrix composed of values each of which is equal to or greater than a predetermined value greater than 0 and smaller than the maximum value taken by the input image. This function allows the dot ratio to be controlled, for example, in such a way that the first dot formation determining section prevents a dot from being produced at least until the pixel value exceeds the predetermined level. Further, in the pixel value equal to or greater than the predetermined level, this function restricts the position of the pixel where the dot is forcibly produced in response to the dither matrix, and hence controls the diffusion of a visibly conspicuous dot of high density. This arrangement improves the dot dispersion.

This arrangement hence provides a high quality image.

Further, only when it has been determined that a dot is not formed by the first dot formation determining section, the second dot formation determining function is used.

This arrangement cuts down processing time.

According to the first embodiment, two or more types of dots having different densities per unit area have a resultant value corresponding to each density. The image forming apparatus further comprises an error calculation section for calculating an error between this resultant value and the corrected pixel value obtained by correcting the input pixel value using the neighboring error diffused from processed pixels; and an error diffusion section for assigning a weight to the error caused by the error calculation section and diffusing it to the neighboring unprocessed pixels. Based on the result of comparison between the corrected pixel value and threshold value, at least one type of the dots used by the second dot formation determining section determines whether or not a dot should be formed. Accordingly, especially when the resultant value of the dot used by the first dot formation determining section is greater than that of the dot used by the second dot formation determining section, the dot used by the second dot formation determining section does not easily appear around the dot used by the first dot formation determining section. This provides excellent diffusion properties in terms of the dots having a higher density together with those having a lower density.

This arrangement, therefore, provides a higher quality image.

According to the second and third embodiments, the second dot formation determining section makes a comparison between the pixel value of the aforementioned target pixel and a value obtained by subtracting from each value of the dither matrix a fixed value in response to the density of the dot used by the second dot formation determining section. Based on the result of this comparison, the second dot formation determining section determines whether or not any one of the dots having each density should be formed at the position where the first dot formation determining section determined that a dot should not be formed. This means that the second dot formation determining section also uses the method of comparison with the dither matrix, or the so-called dither method. Further, the value obtained by simple correction of the dither matrix of the first dot formation determining section is used, thereby saving the storage capacity of a memory to be used.

Thus, this arrangement provides high-speed processing time and reduced costs.

In the third embodiment, the second dot formation determining section determines whether or not it is necessary to form any one of a plurality of types of dots having a lower per-area density than that of the dots used by the first dot formation determining section. Processing is carried out to determine whether or not dots should be formed, in descending order of density per area. A decision made by the second dot formation determining section is not restricted to one type; it can be made on a multilevel basis. In this case, the dot ratio can also be controlled. The dispersion of the visually conspicuous dots of higher density can be controlled and hence the processing time can be reduced.

Thus, even when multilevel data is used, a high quality image is provided, and lost costs are ensured, as a result.

In each embodiment, if the dither matrix is of a Bayer type, the dither matrix can be reduced. This will save the storage capacity of a memory, and will allow the threshold value to be created easily.

Thus, this arrangement provides high-speed processing time and reduced costs.

In each embodiment, when the blue noise mask method is used to determined if the dot using a dither matrix should be formed or not, then the dots used by the first dot formation determining section exhibits a blue noise property. Further, a blue noise property is also shown in the arrangement of dots used by the first and second dot formation determining sections. This improves both the dispersion of the dots used by the first dot formation determining section, and the dispersion of the total dots comprising the dots used by the first dot formation determining section and those used by the second dot formation determining section.

Thus, this arrangement provides a higher quality image.

In each embodiment, when a predetermined value in the dither matrix is changed in response to printing resolution, it is possible to change the value wherein the dots used by the first dot formation determining section start to appear.

For example, when the printing resolution is low, unless the first dots as large or dark dots used by the first dot formation determining section are frequently used, many gaps will be formed on the recording medium, with the result that the density will be insufficient. To solve this problem, when the printing resolution is low, the predetermined value is reduced so that the dot used by the first dot formation determining section will appear earlier.

Thus, this arrangement provides a higher quality image.

In each embodiment, when the predetermined value in the dither matrix is changed in response to the recording mode, it is possible to change the value wherein the dots used by the first dot formation determining section start to appear.

For example, in the high image quality mode, to reduce the degree of graininess, the dots as small or light dots used by the second dot formation determining section must be frequently used. Thus, in the high image quality mode, the predetermined value is increased so that the dots used by the first dot formation determining section do not easily appear.

Thus, this arrangement provides a higher quality image.

In each embodiment, when the predetermined value in the dither matrix is changed in response to the type of the recording medium, it is possible to change the value wherein the dots used by the first dot formation determining section start to appear.

For example, plain paper has a lower ink absorbing capacity than special-purpose paper. When such a recording medium is used, the amount of ink must be reduced. In this case, the dots as large dots used by the first dot formation determining section are mixed in the stage of a lower graduation value. This procedure provides the required density, despite a small amount of ink, thereby saving the overall amount of ink. Thus, when plain paper is used as a recording medium, the predetermined value is set to a small value so that the dots used by the first dot formation determining section will be produced earlier.

Thus, this arrangement provides a higher quality image.

The same advantages as the aforementioned advantages of the image forming apparatus can be obtained from the image forming method and image forming program of the present embodiment.

Without being restricted to the aforementioned embodiments, the present invention can be embodied in a great number of variations with appropriate improvement and design modification, without departing from the technological spirit and scope of the invention claimed.

For example, the output value and resultant value in the aforementioned embodiments may be changed in response to the number of bits to be processed and the number of gradations for quantization. Further, the output value depends on the output system. For example, the present invention can be arranged in such a way that quantization to a four or more levels will be performed.

EFFECTS OF THE INVENTION

According to the aforementioned Feature (1), the dot rate can be controlled, and furthermore, dispersion of the visually conspicuous dots of high density can be controlled so that dot dispersion is improved, and therefore high image quality is ensured. Further, this arrangement reduces the processing time, with the result that cost reduction is achieved.

According to the Feature (2), dot control can be provided even when multilevel data is used, and moreover, dispersion of the visually conspicuous dots of high density can be controlled so that high image quality is ensured. Further, this arrangement reduces the processing time even when multilevel data is used, with the result that cost reduction is achieved.

According to the Feature (3), the dither method is also used in the second dot formation determining section. This feature ensures high speed processing, with the result that cost reduction is achieved.

Further, since this arrangement reduces the memory capacity to be used, high speed processing and lower costs are achieved.

According to the Feature (4), excellent dispersion of the dots of both high and low density is provided so that higher image quality is ensured.

According to the Feature (5), memory capacity can be saved, and the dither matrix thereof can be easily created. This feature ensures high speed processing and low costs.

The Feature (6) improves dispersion of both the dots used by the first dot formation determining section and the dots used by the second dot formation determining section, whereby an image of higher quality is ensured.

According to the Feature (7), it is possible to change the value wherein the dots used by the first dot formation determining section start to appear. This feature provides a high quality image.

According to the Feature (8), it is possible to change the value wherein the dots used by the first dot formation determining section start to appear. This feature provides a high quality image.

According to the Feature (9), it is possible to change the value wherein the dots used by the first dot formation determining section start to appear. This feature provides a high quality image.

According to the Features (10) and (11), similarly to the case described in the Feature (1), the dot rate can be controlled, and furthermore, dispersion of the visually conspicuous dots of high density can be controlled so that dot dispersion is improved, and therefore high image quality is ensured. Further, this arrangement reduces the processing time, with the result that cost reduction is achieved.

While the preferred embodiments of the present invention have been described using specific terms, such description is for illustrative purposes only, and it is to be understood that changes and variations may be made without departing from the spirit or scope of the appended claims.

What is claimed is:

1. An image forming apparatus, for forming an image by using distribution of two or more types of dots, each type of dots having a density per unit area different from a density per unit area of other type of dots, the image forming apparatus comprising:
a first dot formation determining section, for making comparison between a pixel value of a target pixel in an input image and a value in a dither matrix stored in advance, and for determining, based on a result of the comparison, whether or not a dot, of a first type of dots having the highest density per unit area out of the two or more types of dots, should be formed at a position corresponding to the target pixel;
a second dot formation determining section for determining whether or not a dot, of a second type of dots whose density per unit area is lower than that of the first type of dots, should be formed at the position where the first dot formation determining section has determined that the dot of the first type of dots should not be formed, wherein the second dot formation determining section makes a second comparison between the pixel value of the target pixel and a value obtained by subtracting from each value of the dither matrix a fixed value in response to the density per unit area of the second type of dots, and based on a result of the second comparison, the second dot formation determining section determines whether or not any one of the dots of the second type of dots should be formed at the position where the first dot formation determining section determined that a dot should not be formed; and
a dot formation instructing section for instructing, based on results of determination by the first and second dot formation determining sections, whether or not a dot should be formed at the position corresponding to the target pixel;
wherein the dither matrix comprises values, each of the values being equal to or greater than a predetermined value, which is greater than 0 and smaller than the maximum value taken by the pixel value of the input image.

2. The image forming apparatus of claim 1, wherein the second type of dots comprises a plurality of types of dots, each of the plurality of types of dots having a different density per unit area with each other, and the second dot formation determining section determines whether or not a dot of any one of the plurality of types of dots should be formed, in such an order that a type of dots having the higher density per unit area is the earlier.

3. The image forming apparatus of claim 1, wherein the dither matrix is a Bayer type matrix.

4. The image forming apparatus of claim 1, wherein the dither matrix is a blue noise mask type matrix.

5. The image forming apparatus of claim 1, wherein the predetermined value in the dither matrix is changed in response to printing resolution.

6. The image forming apparatus of claim 1, wherein the predetermined value in the dither matrix is changed in response to a recording mode.

7. The image forming apparatus of claim 1, wherein the predetermined value in the dither matrix is changed in response to a type of the recording medium.

8. An image forming apparatus, for forming an image by using distribution of two or more types of dots, each type of dots having a density per unit area different from a density per unit area of other type of dots, the image forming apparatus comprising:
    a first dot formation determining section, for making comparison between a pixel value of a target pixel in an input image and a value in a dither matrix stored in advance, and for determining, based on a result of the comparison, whether or not a dot, of a first type of dots having the highest density per unit area out of the two or more types of dots, should be formed at a position corresponding to the target pixel;
    a second dot formation determining section for determining whether or not a dot, of a second type of dots whose density per unit area is lower than that of the first type of dots, should be formed at the position where the first dot formation determining section has determined that the dot of the first type of dots should not be formed; and
    a dot formation instructing section for instructing, based on results of determination by the first and second dot formation determining sections, whether or not a dot should be formed at the position corresponding to the target pixel;
    wherein the dither matrix comprises values, each of the values being equal to or greater than a predetermined value, which is greater than 0 and smaller than the maximum value taken by the pixel value of the input image,
    wherein the two or more types of dots having different densities per unit area have a resultant value corresponding to each of the density per unit area, and the image forming apparatus further comprising:
    an error calculation section for calculating an error between the resultant value and a corrected pixel value obtained by correcting the input pixel value using a neighboring error diffused from a pixel having been processed; and
    an error diffusion section for assigning a weight to the error calculated by the error calculation section, and diffusing the error weighted to neighboring unprocessed pixels;
    wherein the second dot formation determining section determines whether or not a dot of at least one type of the second type dots should be formed, based on a result of comparison between the corrected pixel value and a second predetermined.

9. The image forming apparatus of claim 8, wherein the second type of dots comprises a plurality of types of dots, each of the plurality of types of dots having a different density per unit area with each other, and the second dot formation determining section determines whether or not a dot of any one of the plurality of types of dots should be formed, in such an order that a type of dots having the higher density per unit area is the earlier.

10. The image forming apparatus of claim 8, wherein the dither matrix is a Bayer type matrix.

11. The image forming apparatus of claim 8, wherein the dither matrix is a blue noise mask type matrix.

12. The image forming apparatus of claim 8, wherein the predetermined value in the dither matrix is changed in response to printing resolution.

13. The image forming apparatus of claim 8, wherein the predetermined value in the dither matrix is changed in response to a recording mode.

14. The image forming apparatus of claim 8, wherein the predetermined value in the dither matrix is changed in response to a type of the recording medium.

15. An image forming method, for forming an image by using distribution of two or more types of dots, each type of dots having a density per unit area different from a density per unit area of other type of dots, the image forming method comprising:
    a first dot formation determining step, for making comparison between a pixel value of a target pixel in an input image and a value in a dither matrix stored in advance, and for determining, based on a result of the comparison, whether or not a dot, of a first type of dots having the highest density per unit area out of the two or more types of dots, should be formed at a position corresponding to the target pixel;
    a second dot formation determining step for determining whether or not a dot, of a second type of dots whose density per unit area is lower than that of the first type of dots, should be formed at the position where the first dot formation determining step has determined that the dot of the first type of dots should not be formed, wherein the second dot formation determining step makes a second comparison between the pixel value of the target pixel and a value obtained by subtracting from each value of the dither matrix a fixed value in response to the density per unit area of the second type of dots, and based on a result of the second comparison, the second dot formation determining step determines whether or not any one of the dots of the second type of dots should be formed at the position where the first dot formation determining step determined that a dot should not be formed; and
    a dot formation instructing step for instructing, based on results of determination by the first and second dot formation determining steps, whether or not a dot should be formed at the position corresponding to the target pixel;
    wherein the dither matrix comprises values, each of the values being equal to or greater than a predetermined value, which is greater than 0 and smaller than the maximum value taken by the pixel value of the input image.

16. The image forming method of claim 15, wherein the second type of dots comprises a plurality of types of dots, each of the plurality of types of dots having a different density per unit area with each other, and the second dot formation determining step determines whether or not a dot of any one of the plurality of types of dots should be formed, in such an order that a type of dots having the higher density per unit area is the earlier.

17. The image forming method of claim 15, wherein the dither matrix is a Bayer type matrix.

18. The image forming method of claim 15, wherein the dither matrix is a blue noise mask type matrix.

19. The image forming method of claim 15, wherein the predetermined value in the dither matrix is changed in response to printing resolution.

20. The image forming method of claim 15, wherein the predetermined value in the dither matrix is changed in response to a recording mode.

21. The image forming method of claim 15, wherein the predetermined value in the dither matrix is changed in response to a type of the recording medium.

22. An image forming method, for forming an image by using distribution of two or more types of dots, each type of dots having a density per unit area different from a density per unit area of other type of dots, the image forming method comprising:

a first dot formation determining step, for making comparison between a pixel value of a target pixel in an input image and a value in a dither matrix stored in advance, and for determining, based on a result of the comparison, whether or not a dot, of a first type of dots having the highest density per unit area out of the two or more types of dots, should be formed at a position corresponding to the target pixel;

a second dot formation determining step for determining whether or not a dot, of a second type of dots whose density per unit area is lower than that of the first type of dots, should be formed at the position where the first dot formation determining step has determined that the dot of the first type of dots should not be formed; and a dot formation instructing step for instructing, based on results of determination by the first and second dot formation determining steps, whether or not a dot should be formed at the position corresponding to the target pixel;

wherein the dither matrix comprises values, each of the values being equal to or greater than a predetermined value, which is greater than 0 and smaller than the maximum value taken by the pixel value of the input image, wherein the two or more types of dots having different densities per unit area have a resultant value corresponding to each of the density per unit area, and the image forming method further comprising:

an error calculating step for calculating an error between the resultant value and a corrected pixel value obtained by correcting the input pixel value using a neighboring error diffused from a pixel having been processed; and an error diffusing step for assigning a weight to the error calculated by the error calculating step, and diffusing the error weighted to neighboring unprocessed pixels;

wherein the second dot formation determining step determines whether or not a dot of at least one type of the second type dots should be formed, based on a result of comparison between the corrected pixel value and a second predetermined.

23. The image forming method of claim 22, wherein the second type of dots comprises a plurality of types of dots, each of the plurality of types of dots having a different density per unit area with each other, and the second dot formation determining step determines whether or not a dot of any one of the plurality of types of: dots should be formed, in such an order that a type of dots having the higher density per unit area is the earlier.

24. The image forming method of claim 22, wherein the dither matrix is a Bayer type matrix.

25. The image forming method of claim 22, wherein the dither matrix is a blue noise mask type matrix.

26. The image forming method of claim 22, wherein the predetermined value in the dither matrix is changed in response to printing resolution.

27. The image forming method of claim 22, wherein the predetermined value in the dither matrix is changed in response to a recording mode.

28. The image forming method of claim 22, wherein the predetermined value in the dither matrix is changed in response to a type of the recording medium.

29. One or more computer-readable media having computer-readable instructions thereon which, when executed by a computer, cause the computer to execute an image forming program to make an image forming apparatus realize functions, for forming an image by using distribution of two or more types of dots, each type of dots having a density per unit area different from a density per unit area of other type of dots, the functions comprising:

a first dot formation determining function, for making comparison between a pixel value of a target pixel in an input image and a value in a dither matrix stored in advance, and for determining, based on a result of the comparison, whether or not a dot, of a first type of dots having the highest density per unit area out of the two or more types of dots, should be formed at a position corresponding to the target pixel;

a second dot formation determining function for determining whether or not a dot, of a second type of dots whose density per unit area is lower than that of the first type of dots, should be formed, wherein the second dot formation determining function makes a second comparison between the pixel value of the target pixel and a value obtained by subtracting from each value of the dither matrix a fixed value in response to the density per unit area of the second type of dots, and based on a result of the second comparison, the second dot formation determining section determines whether or not any one of the dots of the second type of dots should be formed at the position where the first dot formation determining section determined that a dot should not be formed at the position where the first dot formation determining function has determined that the dot of the first type of dots should not be formed; and a dot formation instructing function for instructing, based on results of determination by the first and second dot formation determining functions, whether or not a dot should be formed at the position corresponding to the target pixel;

wherein the dither matrix comprises values, each of the values being equal to or greater than a predetermined value, which is greater than 0 and smaller than the maximum value taken by the pixel value of the input image.

30. The image forming program of claim 29, wherein the second type of dots comprises a plurality of types of dots, each of the plurality of types of dots having a different density per unit area with each other, and the second dot formation determining function determines whether or not a dot of any one of the plurality of types of dots should be formed, in such an order that a type of dots having the higher density per unit area is the earlier.

31. One or more computer-readable media having computer-readable instructions thereon which, when executed by a computer, cause the computer to execute an image forming program to make an image forming apparatus realize functions, for forming an image by using distribution of two or more types of dots, each type of dots having a density per unit area different from a density per units area of other type of dots, the functions comprising:

a first dot formation determining function, for making comparison between a pixel value of a target pixel in an input image and a value in a dither matrix stored in advance, and for determining, based on a result of the comparison, whether or not a dot, of a first type of dots having the highest density per unit area out of the two or more types of dots, should be formed at a position corresponding to the target pixel;

a second dot formation determining function for determining whether or not a dot, of a second type of dots whose density per unit area is lower than that of the first type of dots, should be formed at the position where the first dot formation determining function has determined that the dot of the first type of dots should not be formed; and a dot formation instructing function for instructing, based on results of determination by the first and second dot formation determining functions, whether or not a dot should be formed at the position corresponding to the target pixel;

wherein the dither matrix comprises values, each of the values being equal to or greater than a predetermined value, which is greater than 0 and smaller than the maximum value taken by the pixel value of the input image, wherein two or more types of dots having different densities per unit area have a resultant value corresponding to each of the density per unit area, and the functions further comprising:

an error calculating function for calculating an error between the resultant value and a corrected pixel value obtained by correcting the input pixel value using a neighboring error diffused from a pixel having been processed; and an error diffusing function for assigning a weight to the error calculated by the error calculating function, and diffusing the error weighted to neighboring unprocessed pixels;

wherein the second dot formation determining function determines whether or not a dot of at least one type of the second type dots should be formed, based on a result of comparison between the corrected pixel value and a second predetermined.

* * * * *